(12) United States Patent
Olson et al.

(10) Patent No.: US 6,822,063 B2
(45) Date of Patent: Nov. 23, 2004

(54) HIGHLY DURABLE WATERBORNE RADIATION CURED COATING

(75) Inventors: Keith E. Olson, Apple Valley, MN (US); Bryan M. Anderson, Saint Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 10/231,367

(22) Filed: Aug. 27, 2002

(65) Prior Publication Data

US 2004/0044116 A1 Mar. 4, 2004

(51) Int. Cl.$^7$ .................... C08F 118/04; C08F 116/14
(52) U.S. Cl. ........................... 526/319; 526/334
(58) Field of Search .................. 526/319, 334

(56) References Cited

U.S. PATENT DOCUMENTS

| | | |
|---|---|---|
| 4,517,330 A | 5/1985 | Zdanowski et al. |
| 4,751,273 A | 6/1988 | Lapin et al. |
| 4,996,282 A | 2/1991 | Noren et al. |
| 4,999,216 A | 3/1991 | Gaske et al. |
| 5,091,211 A | 2/1992 | Richard |
| 5,095,154 A | 3/1992 | Liu |
| 5,106,885 A | 4/1992 | Liu et al. |
| 5,319,018 A | 6/1994 | Owens et al. |
| 5,340,653 A | 8/1994 | Noren et al. |
| 5,453,451 A | 9/1995 | Sokol |
| 5,639,546 A | 6/1997 | Bilkadi |
| 5,773,487 A | 6/1998 | Sokol |
| 5,830,937 A | 11/1998 | Shalov et al. |
| 6,096,383 A | 8/2000 | Berg et al. |
| 6,100,313 A | 8/2000 | Treadway |
| 6,156,816 A | 12/2000 | Saint Victor |
| 6,160,067 A | 12/2000 | Eriyama et al. |
| 6,197,844 B1 | 3/2001 | Hamrock et al. |
| 6,228,433 B1 | 5/2001 | Witt |
| 6,245,711 B1 | 6/2001 | Halbrook, Jr. |
| 6,251,963 B1 | 6/2001 | Köhler et al. |
| 6,355,310 B1 | 3/2002 | Saint Victor |
| 6,372,340 B1 | 4/2002 | Tominaga et al. |
| 6,376,568 B1 | 4/2002 | Baudin et al. |
| 6,472,027 B1 | 10/2002 | Olson et al. |
| 2001/0036978 A1 | 11/2001 | Kohler et al. |
| 2002/0042022 A1 | 4/2002 | Leppard et al. |

FOREIGN PATENT DOCUMENTS

| | | |
|---|---|---|
| EP | 0730015 A1 | 9/1996 |
| EP | 0 633 912 B1 * | 9/1998 |
| EP | 0983801 A2 | 3/2000 |
| EP | 1069472 A1 | 1/2001 |
| EP | 1054020 A2 | 11/2001 |
| WO | WO 98/11168 | 3/1998 |

* cited by examiner

Primary Examiner—Robert D. Harlan
(74) Attorney, Agent, or Firm—IPLM Group, P.A.

(57) ABSTRACT

A waterborne radiation curable coating composition containing at least one acrylate functional oligomer having a functionality greater than 3 and at least one vinyl ether oligomer having a functionality greater than 1 provides a cured coating resists deep scratches.

27 Claims, 1 Drawing Sheet

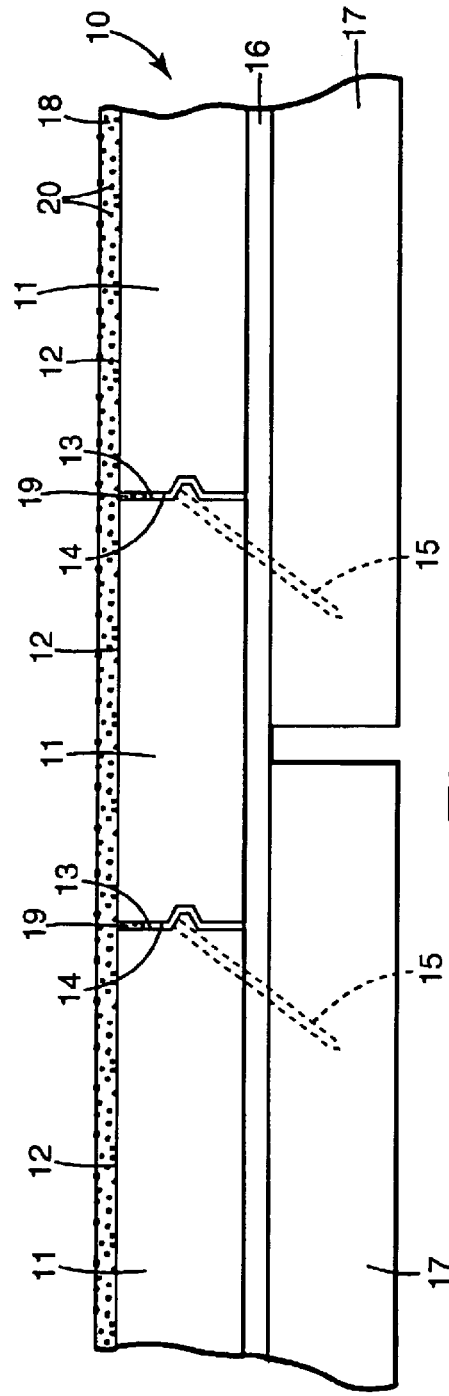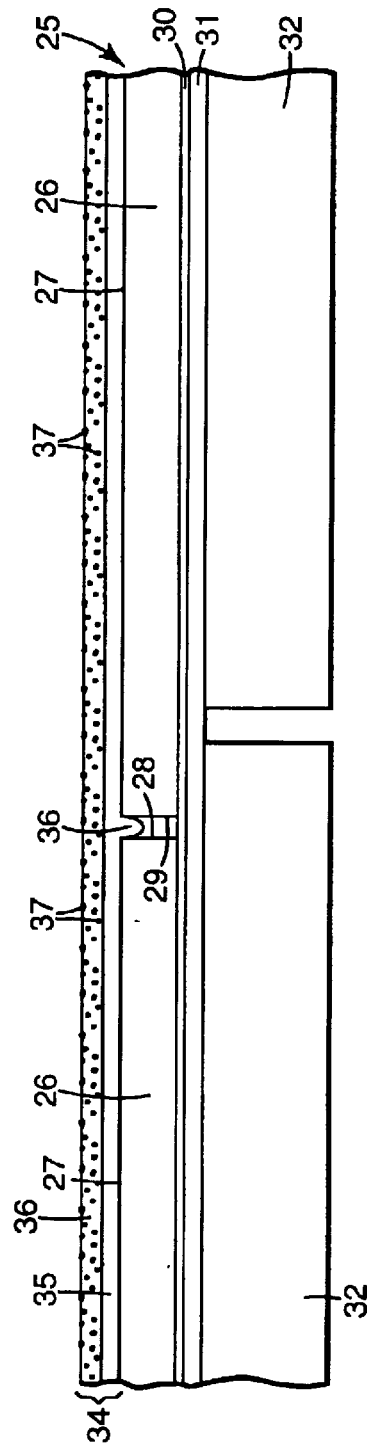

HIGHLY DURABLE WATERBORNE RADIATION CURED COATING

TECHNICAL FIELD

This invention relates to scratch-resistant coatings, strippable coatings, and methods for applying and for removing coatings.

BACKGROUND

UV curable coating compositions have been applied to installed flooring materials such as wood flooring and vinyl tiles. When these jobsite-applied UV cured floor finishes show the effects of wear, they require removal and renewal. Current commercially available jobsite-applied UV cured floor finishes are generally regarded as not being chemically strippable from the flooring material. Instead, more aggressive removal techniques such as floor sanding may be employed, thereby leading to removal of a portion of the underlying floor surface and creating dust issues at the jobsite. This has discouraged the use of jobsite-applied UV cured floor finishes.

SUMMARY OF THE INVENTION

A jobsite-applied floor finish desirably should exhibit an even, smooth appearance and good wear resistance, but be strippable with a suitable strip agent so that it can be removed when worn. Strippability is desirable because in time almost all flooring materials can become sufficiently worn or dulled in appearance to warrant renewal or refinishing. Unfortunately, it has proven difficult to develop UV curable coatings having a desirable balance of appearance, wear resistance and strippability. We have found that it is particularly difficult to develop strippable UV curable coatings that will resist deep scratches.

The present invention provides, in one aspect, a waterborne radiation curable coating composition comprising sufficient amounts of:

a) at least one acrylate functional oligomer having a functionality greater than 3, and b) at least one vinyl ether oligomer having a functionality greater than 1 to provide a coating that when cured will resist deep scratches.

The invention provides, in another aspect, a hardened coating on a substrate, the coating comprising a radiation cured reaction product of a waterborne composition containing sufficient amounts of:

(a) at least one acrylate functional oligomer having a functionality greater than 3, and (b) at least one vinyl ether oligomer having a functionality greater than 1 so that the coating resists deep scratches.

The invention provides, in yet another aspect, a coated floor wherein the coating comprises a radiation cured reaction product of a waterborne coating composition containing sufficient amounts of at least one acrylate functional oligomer having a functionality greater than 3 so that the coating resists deep scratches.

The invention also provides a finish kit comprising (a) a waterborne radiation curable coating composition comprising at least one acrylate functional oligomer having a functionality greater than 3 and at least one vinyl ether oligomer having a functionality greater than 1, (b) a strippable intermediate coating and (c) instructions for jobsite application of the intermediate coating and radiation curable coating composition to a substrate, wherein the radiation curable coating composition provides a coating that when cured will resist deep scratches.

The invention also provides a method for protecting a surface comprising applying to the surface a waterborne radiation curable coating composition comprising:

(a) at least one acrylate functional oligomer having a functionality greater than 3, and (b) at least one vinyl ether oligomer having a functionality greater than 1 and drying and radiation curing the coating to provide a cured film that resists deep scratches.

The invention also provides a method for protecting a floor comprising applying to the floor a waterborne radiation curable coating composition comprising at least one acrylate functional oligomer having a functionality greater than 3, and drying and radiation curing the coating to provide a cured film that resists deep scratches.

BRIEF DESCRIPTION OF THE DRAWING

FIG. 1 shows a side view of a hardened coating of the invention on a multipiece flooring material substrate.

FIG. 2 shows a side view of a laminate finish of the invention on a multipiece flooring material substrate.

DETAILED DESCRIPTION

As used in connection with this invention, a radiation curable coating is regarded as being "waterborne" if it contains sufficient water (in more than trace amounts) to permit application of the coating to a substrate and air-drying to form a self-leveling film.

As used in connection with this invention, an "oligomer" is a polymerizable moiety containing a plurality (e.g., 2 to about 8) of monomer units.

As used in connection with this invention, a cured or hardened coating or film is regarded as resisting "deep scratches" if when subjected to an evaluation using the Gardner Balanced Beam Scrape Adhesion Mar Tester (Deep Scratch; Hoffman Stylus) as described in Example 1 the coating or film does not exhibit failure at a Hoffman rating below 6.

As used in connection with this invention, a cured or hardened coating or film is regarded as being "strippable" if when subjected to the action of a suitable strip agent, the coating or film can readily be removed from an underlying substrate using simple, non-abrasive measures such as a mop and detergent solution, or mildly abrasive but substrate non-damaging measures such as a nonwoven floor scrub pad. Strippability preferably is evaluated using the 7 point scale set out below in Example 1 and a strip agent containing a polar solvent such as benzyl alcohol.

The coating compositions of the present invention can be applied to flooring materials and other surfaces (e.g., architectural surfaces) as one or more coats of the same material, or as one or more coats of different materials. In a preferred embodiment, the coating compositions of the invention are part of a laminate finish comprising a strippable intermediate coating atop the substrate and a strip agent-permeable radiation cured coating atop the intermediate coating. The intermediate coating and strip agent-permeable radiation cured coating can each be applied as one or as more than one coats of the same material, or as two or more coats of different materials. In the interest of brevity, a layer or combination of layers of the intermediate coating will be referred to collectively as the "intermediate coating", a layer or combination of layers of the strip agent-permeable radiation cured coating will be referred to collectively as the "topcoat", and a combination of the intermediate coating and the topcoat will be referred to collectively as a "laminate finish".

As used in connection with this invention, a topcoat of a laminate finish is regarded as being "strip agent-permeable" if when coated atop the desired intermediate coating and subjected to the action of a suitable strip agent, the strip agent permeates or otherwise penetrates the topcoat sufficiently so that the both the topcoat and intermediate coating can be removed from the substrate. Strip agent permeability can be enhanced by mechanically roughening the topcoat (using, for example, a nonwoven floor scrub pad, brush or other mild abrasive measure) just prior to stripping. A topcoat will be regarded as being strip agent-permeable even if such mechanical roughening is necessary for stripping, so long as such mechanical roughening does not damage the underlying substrate.

The coating compositions of the invention can be applied to a variety of substrates, including resilient substances such as sheet vinyl goods (e.g., vinyl flooring), vinyl composite tiles, and synthetic sports floors; non-resilient substances such as concrete, marble, wood, ceramic tile, grout and terrazzo; and polymeric substances such as vinyl esters and polyesters. The coated substrates can have a wide variety of uses including floors, walls, ceilings, furniture and indoor or outdoor signs. The coating compositions can be applied at a variety of jobsites, including indoor and outdoor sites involving new or existing residential, commercial and government- or agency-owned facilities.

The coating compositions of the invention can be "jobsite-applied" to flooring or other multipiece substrates, especially wood and vinyl substrates, after the substrate has been installed, or can be "factory-applied" to flooring or other substrates before the substrate is installed. This can be better understood by referring to FIG. 1, which shows an end view of multipiece flooring material 10 comprising floorboards 11. Each floorboard 11 has a top surface 12, side surfaces 13 and 14, and additional side or end surfaces that are not shown in FIG. 1. Fasteners 15 (shown in phantom in FIG. 1) hold flooring material 10 in place on underlayment 16 and subfloor 17. UV cured topcoat 18 coats the top surfaces 12, and fills and seals at least the uppermost portions of the gaps 19 between each floorboard 11. Topcoat 18 contains small inorganic particles 20 which impart improved scratch resistance to topcoat 18. Because flooring material 10 can be installed before it was finished, the tops 12 of floorboards 11 can be sanded so that they are coplanar before topcoat 18 is applied, filling and sealing the gaps 19 between floorboards 11. This enables flooring material 10 to have a better appearance and easier cleanability than would be the case if the topcoat had been factory-applied prior to installation of the flooring material. In a multipiece floor made from floorboards whose finish has been factory-applied, there can be small differences in height between adjacent floorboards. This arises because the floorboards cannot be sanded after installation sufficiently to make the tops of the floorboards coplanar without potentially also removing at least some of the factory-applied finish. In such a floor, small gaps between adjacent floorboards typically are not filled or sealed by the factory-applied finish.

FIG. 2 shows an end view of multipiece flooring material 25 comprising vinyl composite tiles 26. Each tile 26 has a top surface 27, sides surfaces 28 and 29, and additional side or end surfaces that are not shown in FIG. 1. Adhesive 30 holds tiles 26 in place on underlayment 31 and subfloor 32. UV cured laminate finish 34 includes intermediate coating 35 atop the tiles 26 and a strip agent-permeable topcoat 36 atop the intermediate coating 35. Intermediate coating 35 coats the top surfaces 27, and fills and seals at least the uppermost portions of the gap 36 between each tile 26. Strip agent-permeable topcoat 36 contains small inorganic particles 37 which impart improved scratch resistance to finish 34.

The waterborne radiation curable coating compositions of the invention contain at least one acrylate functional oligomer having a functionality greater than 3, preferably of at least 5, and more preferably of at least 6. The acrylate functional groups can be acrylate groups, methacrylate groups or a mixture thereof. A variety of acrylate functional oligomers can be employed. Preferred acrylate functional oligomers are water soluble or water dispersible. However, the acrylate functional oligomer need not itself be water soluble or water dispersible so long as the remaining polymerizable components of the coating composition form a water soluble or water dispersible mixture that adequately solubilizes or disperses the acrylate functional oligomer. Water solubility or water dispersibility can be facilitated in a variety of ways that will be familiar to those skilled in the art, including forming a salt of the acrylate, incorporating an appropriate functional group in the acrylate, or adding a suitable cosolvent or surfactant to the radiation curable composition. Representative acrylate functional oligomers include LAROMER™ PE 55W, LAROMER™ PE 55WN and LAROMER™ LR 8895 waterborne polyester acrylates (functionality 3.5; all available from BASF Corp.), LAROMER™ PE 44F, LAROMER™ LR 8800 and LAROMER™ LR 8981 polyester acrylates (functionality 3.5; all available from BASF Corp.); LAROMER™ LR 8982 modified tetrafunctional polyether acrylate (available from BASF Corp.); LAROMER™ PO 84F and LAROMER™ PO 94F amine-modified polyether acrylates (functionality 3.5; both available from BASF Corp.); LAROMER™ UP 35D unsaturated polyester (functionality 3.5; available from BASF Corp.); EBECRYL™ 40 and EBECRYL™ 140 tetrafunctional acrylates (both available from UCB Chemicals); EBECRYL™ 80 and EBECRYL™ 83 amine-modified tetrafunctional polyester acrylates (both available from UCB Chemicals); EBECRYL™ 657 and EBECRYL™ 810 polyester tetraacrylates (both available from UCB Chemicals ); EBECRYL™ 1290 and EBECRYL™ 8301 hexafunctional aliphatic urethane acrylate (both available from UCB Chemicals); EBECRYL™ 220 hexafunctional aromatic urethane acrylate (available from UCB Chemicals); EBECRYL™ 830, EBECRYL™ 835, EBECRYL™ 870 and EBECRYL™ 2870 hexafunctional polyester acrylates (all available from UCB Chemicals); EBECRYL™ 450 fatty acid modified polyester hexaacrylate (available from UCB Chemicals); DPHPA™ dipentaerythritol pentaacrylate (functionality 5; available from UCB Chemicals); DPHA™ dipentaerythritol hexaacrylate (functionality 6; available from UCB Chemicals) and mixtures of any of the foregoing. The amount of acrylate functional oligomer in the radiation curable compositions of the invention will vary depending in part on the other ingredients and on the intended application and application conditions. As a general guide, the amount of acrylate functional oligomer preferably is from about 13 to about 50 weight percent based on the weight of the radiation curable coating composition. More preferably, the radiation curable coating composition contains about 18 to about 37 weight percent acrylate functional oligomer. As a general guide, increases in the amount of acrylate functional oligomer or in the functionality of the acrylate will cause the coating hardness and deep scratch resistance to increase and the coating strippability to decrease.

The waterborne radiation curable coating compositions of the invention also contain at least one vinyl ether oligomer having a functionality greater than 1. Preferably the vinyl ether oligomer has a functionality of at least 2, and more preferably a functionality greater than 2. A variety of such vinyl ether oligomers can be employed. Preferred vinyl ether oligomers are water soluble or water dispersible. However, the vinyl ether oligomer need not itself be water soluble or water dispersible so long as the remaining polymerizable components of the coating composition form a water soluble or water dispersible mixture that adequately solubilizes or disperses the vinyl ether oligomer. Water solubility or water dispersibility can be facilitated in a variety of ways that will be familiar to those skilled in the art, including those mentioned above with respect to the acrylate. Representative vinyl ether oligomers include triethylene glycol divinyl ether, trimethylolethane trivinyl ether; the polyvinylates of polyhydric alcohols such as ethylene glycol, butylene glycol, glycerin, trimethylol propane or pentaerythritol; polyvinyl ether polyurethanes such as those described in U.S. Pat. Nos. 4,751,273 and 4,996,282 and having a functionality greater than 1; vinyl ethers such as those described in U.S. Pat. No. 5,340,653 and having a functionality greater than 1; and the trivinyl ethers described in U.S. Pat. Nos. 5,095,154 and 5,106,885. Preferred commercially available vinyl ethers include VEctomer™ VE 1312 vinyl ether terminated aromatic ester oligomer (functionality 3.4; available from Morflex Inc.) and VEctomer™ VE 5015 tris(4-vinyloxybutyl)trimellitate (functionality 2.8; available from Morflex Inc.). The amount of vinyl ether oligomer in the radiation curable compositions of the invention will vary depending in part on the other ingredients and on the intended application and application conditions. As a general guide, the amount of vinyl ether oligomer preferably is from about 1 to about 20 weight percent based on the weight of the radiation curable coating composition. More preferably, the radiation curable coating composition contains about 3 to about 10 weight percent vinyl ether oligomer. As a general guide, increases in the amount of vinyl ether oligomer or in the functionality of the vinyl ether oligomer will cause deep scratch resistance (and, up to a point, coating strippability) to increase. The effect of increased vinyl ether oligomer amount on strippability is surprising and of particular value in formulating radiation curable coatings that can subsequently be stripped from a substrate. This effect can also be used to attain a balance of desirable properties in compositions containing higher-functional acrylate oligomers, since the acrylate oligomer contributes to deep scratch resistance but decreases strippability.

The acrylate functional oligomer and vinyl ether oligomer are believed to be copolymerizable. This is believed to contribute to the overall toughness and hardness of the cured compositions of the invention.

Preferably the compositions of the invention provide coatings that when cured will exhibit a deep scratch resistance of greater than 6, more preferably at least about 8 when evaluated using the Hoffman Scratch Hardness Test set out below in Example 1.

The waterborne radiation curable coating compositions of the invention can include other radiation curable materials. Preferred such materials are water soluble or water dispersible, but need not be so if the remaining polymerizable components of the coating composition form a water soluble or water dispersible mixture that adequately solubilizes or disperses such other radiation curable material. Representative other radiation curable materials include urethanes, acrylates having up to three functional groups, unsaturated polyesters, monovinyl ethers, epoxies and blends or copolymers thereof. Particularly preferred radiation curable materials are described in copending U.S. patent application Ser. No. 09/560,170, filed Apr. 28, 2000, pending, and Ser. No. 09/642,395, filed Aug. 18, 2000, U.S. Pat. No. 6,472,027 the disclosures of which are both incorporated by reference. Suitable commercially or experimentally available radiation curable materials include the ZVOC™ series of UV curable coatings from UV Coatings Limited; ROSHIELD™ 3120 UV curable acrylate coating from Rohm & Haas; NEORAD™ NR-3709 UV curable aliphatic urethane coating from Zeneca Resins; LAROMER™ PE 22 WN polyester acrylate emulsion, LAROMER™ LR 8949 aqueous radiation curable aliphatic polyurethane dispersion and LAROMER™ LR 8983 aqueous radiation curable aromatic polyurethane dispersion, all available from BASF Corp.; VIAKTIN™ VTE 6155 aliphatic urethane acrylate, VTE 6165 aromatic urethane acrylate and VTE 6169 aliphatic polyester urethane radiation curing resins, all available from Solutia, Inc.; 98-283W urethane acrylate, available from Hans Rahn & Co.; and materials such as those described in U.S. Pat. Nos. 4,999,216, 5,091,211, 5,453,451, 5,773,487, 5,830,937, 6,096,383, 6,197,844 and 6,228,433. Alteration of the types and amounts of such other radiation curable materials can help optimize properties such as adhesion to a substrate or to a strippable intermediate coating, wear resistance, finish strippability, etc. The amount of other radiation curable materials in the radiation curable compositions of the invention can vary depending in part on the ingredients in the composition and on the intended application and application conditions. As a general guide, the amount of other radiation curable materials preferably is from 0 to about 5 weight percent based on the weight of the radiation curable coating composition. More preferably, the radiation curable coating composition contains about 2 to about 4 weight percent other radiation curable materials.

The amount of water in the radiation curable compositions of the invention will vary depending in part on the other ingredients and on the intended application and application conditions. As a general guide, the amount of water preferably is from about 15 to about 85 weight percent based on the weight of the radiation curable coating composition. More preferably, the radiation curable coating composition contains about 40 to about 75 weight percent water.

Volatile organic solvents can be added to the compositions of the invention if desired. Such solvents (referred to herein as "diluting solvents") can be added to facilitate application of the radiation curable coating, e.g., to lower viscosity, improve substrate wetting or to provide a longer drying time. Suitable diluting solvents include acetamidophenol; acetanilide; acetophenone; 2-acetyl-1-methylpyrrole; benzyl acetate; benzyl benzoate; benzyloxyethanol; ethers or hydroxyethers such as ethylene glycol phenyl ether (commercially available as "DOWANOL EPh" from Dow Chemical Co.) and propylene glycol phenyl ether (commercially available as "DOWANOL PPh" from Dow Chemical Co.); essential oils (e.g., pinenes (alphas, betas, etc.), terpineols, terpinenes, carvone, cinnamealdehyde, borneol and its esters, citrals, ionenes, jasmine oil, limonene, dipentene, linalool and its esters); dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products available under the trade designations DBE, DBE-3, DBE-4, DBE-5, DBE-6, DBE-9, DBE-IB, and DBE-ME from DuPont Nylon); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate; and mixtures thereof. Cosolvents can also be added if desired to assist in solubilizing the radiation curable coating. Suitable cosolvents include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp.; and mixtures thereof. Preferably, the amount of diluting solvent or cosolvent is from 0 to about 7 weight percent based on the weight of polymerizable solids in the radiation curable coating composition. More preferably, the radiation curable coating composition contains about 2 to about 6 weight percent diluting solvent or cosolvent.

The radiation curable coatings can contain a variety of other ingredients. For example, the coating preferably contains one or more photoinitiators. Exemplary photoinitiators include, but are not limited to, 1-phenyl-2-hydroxy-2-methyl-1-propanone; oligo{2-hydroxy-2 methyl-1-[4-(methylvinyl)phenyl]propanone}; 2-hydroxy 2-methyl 1-phenyl propan-1 one; bis (2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl) ketone; 2,2-dimethoxy-2-phenyl acetophenone; benzophenone; benzoic acid; (n-5,2,4-cyclopentadien-1-yl)[1,2,3,4,5,6-n)-(1-methylethyl)benzene]iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE 500, commercially available from Ciba Specialty Chemicals); bis(n,5,2,4-cyclopentadien-1-yl)-bis[2,6-difluoro-3-(1H-pyrol-1-yl)phenyl]titanium (IRGACURE 784 DC, commercially available from Ciba Specialty Chemicals); 2-benzyl-2-N,N-dimethyl amino-1-(4-morpholinophenyl)-1-butanone (IRGACURE 369, commercially available from Ciba Specialty Chemicals); and the EB3, KB1, TZT, KIP 100F, ITX, EDB, X15 and KT37 series of ESACURE™ photoinitiators (commercially available from Sartomer Inc.). The radiation curable coating composition preferably contains sufficient photoinitiator to facilitate the desired rate and degree of photocuring without unduly harming storage stability. Preferably, the radiation curable coating composition contains about 0.5 to about 3 weight percent photoinitiator based on the weight of polymerizable solids in the radiation curable material. More preferably, the radiation curable coating contains about 1 to about 2.5 weight percent photoinitiator.

The radiation curable coating composition can contain a variety of adjuvants to alter the performance of properties of the coating before or after application to a substrate. Useful adjuvants include inorganic particles (discussed in more detail below), surfactants, defoamers, waxes, indicators, colorants, optical brighteners, UVA absorbers, light stabilizers and antioxidants. The types and amounts of such adjuvants will be apparent to those skilled in the art.

The radiation curable coating preferably contains inorganic particles that will enhance the abrasion, scratch or wear resistance of the coating. Preferred inorganic particles are described in copending U.S. patent application Ser. No. 09/657,420 filed Sep. 8, 2000 and entitled SCRATCH-RESISTANT STRIPPABLE FINISH, the disclosure of which is incorporated herein by reference. Preferred inorganic particles for use in the present invention include silicas and aluminas. Although the inorganic particles can if desired be obtained in dry powder form, preferably they are obtained in aqueous or solvent-based dispersions, as such dispersions are much more easily combined with the radiation curable material. In general, solvent-based inorganic particle dispersions can easily be combined with waterborne radiation curable materials and generally provide good gloss and good film integrity in the cured coating. However, solvent-based inorganic particle dispersions tend to be more expensive than aqueous inorganic particle dispersions. When waterborne inorganic particle dispersions are combined with waterborne radiation curable materials, the resulting coating tends to have somewhat lower gloss and film integrity. We prefer to combine a waterborne inorganic particle dispersion with a suitable dispersing solvent (e.g., alcohols such as methanol, ethanol or isopropyl alcohol) that will dissolve in or be miscible with both water and the radiation curable material, and that will help to disperse the inorganic particles in the radiation curable material. The resulting mixture of waterborne inorganic particles and dispersing solvent can be combined with the radiation curable material and mixed using a suitable mixing device such as a sonic mixer.

Suitable inorganic particles are available in a wide variety of average particle diameters. Small diameter particles tend to provide better adhesion of the coating to the substrate, but also tend to be more expensive than large diameter particles. Large particles tend to provide better surface scratch resistance. Preferably, the average particle diameter is about 3 to about 100 nanometers, more preferably about 12 to about 75 nanometers. In some cases, use of a bimodal mixture of small and large diameter particles can provide a cured coating having an optimal balance of good coating properties, scratch resistance and durability. Silicas are particularly preferred inorganic particles, especially for use in waterborne coatings. Suitable silicas include fumed silicas such as AEROSIL™ OX-50 (40 nanometer average particle diameter silica available from Degussa-Hüls AG) and CABOSIL™ M5 (available from Cabot Corp.); stabilized silica sols such as KLEBOSOL™ 30H25 (25 nm average particle diameter proton stabilized waterborne colloidal silica sol having a ph of 2.2 and a 30% solids content, available from Clariant Corp.), KLEBOSOL 30H50 (50 nm average particle diameter proton stabilized waterborne colloidal silica sol having a pH of 2.5 to 3.0 and a 30% solids content, available from Clariant Corp.), KLEBOSOL 30N12 (12 nm average particle diameter ammonium ion stabilized waterborne colloidal silica sol having a pH of 9.5 to 10.5 and a 30% solids content, available from Clariant Corp.), KLEBOSOL 30N25 (25 nm average particle diameter ammonium ion stabilized waterborne colloidal silica sol having a pH of 9.6 and a 30% solids content, available from Clariant Corp.), NALCO™ 1034A (20 nanometer average particle diameter acidic colloidal silica sol having a pH of 2.8 and a 34% solids content, available from Nalco Chemical Co.), NALCO 1130 (8 nanometer average particle diameter alkaline colloidal silica sol having a pH of 10.0 and a 30% solids content, available from Nalco Chemical Co.) and NALCO 1140 (15 nanometer average particle diameter alkaline colloidal silica sol having a pH of 9.4 and a 40% solids content, available from Nalco Chemical Co.); silica organosols such as NALCO 1057 (20 nanometer average particle diameter colloidal silica sol having a 30% solids content in ethanol, available from Nalco Chemical Co.), the SNOWTEX™ series of silicon dioxide particles such as SNOWTEX OZ and SNOWTEX OZL (available from Nissan Chemical), HIGHLINK™ OG 1-32 (25 nm average particle diameter silica organosols having a 30% solids content in ethylene glycol, available from Clariant Corp.), HIGHLINK OG 401-31 (13 nm average particle diameter silica organosol having a 30% solids content in ethylene glycol mono n-propyl ether, available from Clariant Corp.) and HIGHLINK OG 401-51 (25 nm average particle diameter silica organosol having a 50% solids content in ethyleneglycol mono n-propyl ether, available from Clariant Corp.); colloidal silicas such as LUDOX™ AM, LUDOX AM-30 (12 nm average particle diameter aqueous silica sol having a 30% solids content), LUDOX AS, LUDOX HS40, LUDOX LS, LUDOX TM and LUDOX TMA (22 nm average particle diameter aqueous silica sol having a 34% solids content), all available from DuPont Silica Products); and spherical silicas such as the MONOSPHER™ series available from EM Industries, Inc. Suitable aluminas include Aluminum Oxide C (available from Degussa-Hüls AG) and KLEBOSOL 30CAL25 alumina modified colloidal silica (available from Clariant Corp.). The radiation curable coating preferably contains sufficient inorganic particles to provide increased scratch resistance compared to a radiation cured coating that does not contain inorganic particles. If desired, large amounts of inorganic particles can be employed, so long as the other properties of the radiation curable coating are not unduly harmed by the thickening effect or loss of gloss caused by addition of the inorganic particles to the radiation curable material. However, relatively small amounts of inorganic particles have been found to provide a significant improvement in scratch resistance. Preferably, the radiation curable coating contains about 1 to about 10 weight percent inorganic particles based on the weight of polymerizable solids in the radiation curable material. More preferably, the radiation curable coating contains about 1 to about 5 weight percent inorganic particles, and most preferably about 1 to about 3 weight percent inorganic particles.

As mentioned above, the coating can be part of a laminate finish comprising the radiation curable coating atop a strippable intermediate coating. A variety of intermediate coatings can be employed. Preferred intermediate coatings are strippable using a strip agent that is capable of permeating the topcoat. Thus, the choice of intermediate coating may be determined in part by the chosen topcoat and stripping agent. When the intermediate coating and topcoat are each coated alone on a vinyl composite tile substrate and evaluated using the 7 point scale set out below in Example 1, the intermediate coating desirably should have a higher strippability rating than the topcoat. Preferably, there will be at least a 1 point differential, more preferably at least a 2 point differential, and most preferably at least a 4 point differential in observed strippability rating values between the intermediate coating and topcoat. Waterborne intermediate coatings are preferred for ease of application. Water soluble acid-containing polymers crosslinked using transition metals (e.g., metal crosslinked acrylics) are a particularly preferred class of intermediate coatings. These can be stripped using a variety of strip agents (described in more detail below) that dissolve the intermediate coating or attack the crosslinking site. Waterborne urethane-based finishes (optionally used without the crosslinkers normally employed with such finishes) are another preferred class of intermediate coating materials. Preferred intermediate coatings will have a rating of 6 or more, more preferably a rating of 7, when coated alone on a vinyl composite tile substrate and evaluated using the 7 point scale strippability set out below in Example 1. Suitable commercially available intermediate coating materials include PADLOCK™, GEMSTAR LASER™ and TAJ MAHAL™ acrylic floor finishes from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FORTRESS™ urethane acrylic finish from Minuteman, International, Inc.; UPPER LIMITS™ acrylic finish from Spartan Chemical Co.; blends of the above-mentioned ROSHIELD acrylate coating with styrene maleic anhydride polymer as described in PCT Published Patent Application No. 98/11168; and materials such as those described in U.S. Pat. Nos. 4,517,330 and 5,319,018 and the patents cited therein. Suitable commercially available urethane floor finishes include COURTMASTER II™ urethane floor finish from Ecolab Inc. Strippable floor coatings designated as "sealers" (e.g., OVER AND UNDER™ floor sealer, available from S. C. Johnson Professional Products and ACRYLKOTE™ Seal and Finish and PREP Floor Seal from Minuteman, International, Inc.) and strippable coatings based on polyvinylacetates can also be used. Blends of coatings (e.g., up to 50 weight percent of a radiation curable coating with less than 50 weight percent of a non-radiation curable coating) can also be employed as intermediate coating materials. If desired, two or more layers of different intermediate coatings can be employed in laminate finishes of the invention, in order to optimize properties such as adhesion to the substrate or to the radiation curable coating, wear resistance, coating strippability, etc.

The intermediate coating can contain a variety of adjuvants to alter the performance or properties of the intermediate coating before or after application to a substrate. Useful adjuvants include inorganic particles, surfactants, defoamers, waxes, indicators, colorants, optical brighteners, UVA absorbers, light stabilizers and antioxidants. The types and amounts of such adjuvants will be apparent to those skilled in the art.

Suitable strip agents include compositions containing phenyl alcohols (e.g., benzyl alcohol); glycol ethers (e.g., propylene glycol methyl ether; phenoxy ethanol; phenoxy propanol; and ETHYL CARBITOL™, BUTYL CARBITOL™ and BUTYL CELLOSOLVE™, all available from Union Carbide Corp.); metasilicates; alkanolamines (e.g., monoethanolamine); and caustic agents such as sodium or potassium hydroxide. Compositions containing phenyl alcohols are preferred for stripping laminate finishes employing acrylate or urethane topcoats owing to the relatively high rate at which phenyl alcohols penetrate such topcoats and their ease of use and low odor.

A particularly preferred strip agent concentrate contains a polar solvent that is denser than water, and a sufficiently low level of cosolvent or surfactant so that upon mixing with water a pseudo-stable aqueous dispersion forms which will phase-separate following application to a surface, as described in copending U.S. patent application Ser. No. 09/641,775, filed Aug. 18, 2000, U.S. Pat. No. 6,542,942 the disclosure of which is incorporated by reference.

Another preferred strip agent concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in copending application Ser. No. 09/383, 000 filed Aug. 25, 1999, U.S. Pat. No. 6,583,101 the disclosure of which is incorporated by reference.

Suitable commercially available strippers include HAWK™, FREEDOM™ and CARE STRIP LOW ODOR™ stripper concentrates from Ecolab Inc.; JUGGERNAUT™ stripper concentrate from Buckeye International, Inc.; and TWIST AND FILL™ stripper concentrate from 3M. Although no longer commercially available, an aqueous stripper concentrate previously sold in Canada as FULLER FORMULA 3100™ Super Concentrate (Fuller Brush, Québec) can also be used in the present invention.

The strip agent can contain a variety of adjuvants to alter the performance or properties of the strip agent before or after application to a cured finish. Useful adjuvants include abrasive particles, surfactants, defoamers, indicators, colorants, optical brighteners and disinfectants. The types and amounts of such adjuvants will be apparent to those skilled in the art.

The coating compositions of the invention can be applied using a variety of methods, including spraying, brushing, roll coating and flood coating. Mop application is preferred for coating floors. Typically, the substrate should first be cleaned and any loose debris removed. One or more coats of the optional intermediate coating (diluted if necessary with water or another suitable solvent) are applied to the substrate, and allowed to dry. Three to five coats of the intermediate coating typically will be preferred for coating floors. When used on floors, each coat of the intermediate coating preferably will have a dry coating thickness of about 2.5 to about 75 micrometers, more preferably about 2.5 to about 20 micrometers. Preferably the overall intermediate dry coating thickness will be about 5 to about 150 micrometers, more preferably about 5 to about 40 micrometers.

Next, one or more coats of the waterborne topcoat (diluted if necessary with additional water or with another suitable solvent) can be applied to the substrate (or to the optional intermediate coating if employed once the intermediate coating has dried to the touch). One to five coats of the topcoat typically will be preferred for coating floors. Each coat of the topcoat preferably is individually cured using a suitable radiation curing apparatus. When used on floors, each coat of the topcoat preferably will have a dry coating thickness of about 2.5 to about 75 micrometers, more preferably about 2.5 to about 20 micrometers. Preferably the overall topcoat dry coating thickness will be about 5 to about 150 micrometers, more preferably about 5 to about 40 micrometers. When used on floors, laminate finishes of the invention preferably will have an overall dry coating thickness of about 10 to about 300 micrometers, more preferably about 10 to about 80 micrometers.

The finish can thereafter receive normal maintenance until such time as it is desired to remove and renew the finish. The finish can be stripped by optionally abrading the topcoat with a suitably mild abrasive (e.g., a green or black SCOTCH-BRITE™ Floor Maintenance pad from 3M) followed by application of the desired strip agent. The strip agent should be allowed to stand for a suitable time (e.g., for a minute or more, and typically between about 5 and about 20 minutes) while it permeates through the topcoat (and in case of the laminate finish, while it attacks the intermediate coating). After the finish softens sufficiently, it can be removed using a variety of techniques including vacuuming, mopping or wiping. Removal will usually be made easier if water or a suitable detergent solution is applied to the softened finish. The substrate can be allowed to dry and new layers of the optional intermediate coat and the topcoat can be applied to renew the finish.

The finishes of the invention typically will be sold in the form of a kit including the topcoat (and optionally the intermediate coating) in suitable containers together with suitable directions for carrying out a method of the invention. If desired, the intermediate coating or topcoat could be packaged as concentrates intended to be mixed with water or another suitable solvent prior to application. Optionally the kit may include the strip agent in a suitable container. The strip agent typically will be mixed with water or another suitable carrier at about 5–30% by weight active ingredients prior to application. The kit can also contain undercoat materials (e.g., leveling coatings) that can be applied to the substrate before application of the optional intermediate coating or the topcoat or various overcoat materials (e.g., maintenance coats or wax finishes) that can be applied atop the topcoat. Maintenance coats typically will be applied when the initially-applied coating exhibits noticeable wear or loss of gloss, and typically will be applied at solids levels that are the same as or somewhat less than the solids levels of the initially-applied coating.

If desired, the finishes of the invention can be factory-applied to a variety of substrates to provide a coating that resists deep scratches. For example, when factory-applied to a multipiece flooring material, the pieces typically will be coated on at least the top surface and optionally coated or partially coated on the side or bottom surfaces. The applied coating can be strippable, e.g., a laminate finish employing an intermediate coating and topcoat as described above. The compositions of the invention also provide very durable waterborne radiation curable wood finishes that can be applied to a variety of surfaces. The resulting coatings are very tough and durable, and resist deep scratches.

The invention is further illustrated in the following non-limiting examples, in which all parts and percentages are by weight unless otherwise indicated. In the examples, the coated tiles were evaluated in several respects. Strippability was determined by preparing a stripper composition from 75 wt. % benzyl alcohol, 7.5 wt. % diethylene glycol monobutyl ether, 7.5 wt. % dipropylene glycol N-butyl ether, 7.5 wt. % propylene glycol phenyl ether and 2.5 wt. % SURFONIC™ 24-9 ethoxylated alcohol (Huntsman Chemical) to form a concentrate, and by combining 10 parts of the resulting concentrate with 3 parts monoethanolamine, 0.15 parts ZONYL™ FSJ fluorosurfactant (commercially available from E. I. duPont de Nemours and Co.) and 87 parts water. The resulting diluted stripper composition forms a pseudo-stable aqueous dispersion when stirred. Shortly after application of the diluted stripper composition to a surface, the composition undergoes phase separation to form a solvent layer containing primarily benzyl alcohol adjacent to the surface with a layer containing primarily water atop the solvent layer. The diluted stripper composition was identified as "Stripper A".

A 50 mm diameter by 38 mm high carbon steel cylinder with a weight of 571 grams was wrapped with a green nonwoven pad (SCOTCH-BRITE™ Floor Maintenance Disc, 3M). When rolled over a coated tile, the cylinder exerted a pressure of 2.8 kPa and mimicked the pressure applied by a standard electric floor burnisher. The coated tiles were placed on a level surface and flooded with a sufficient quantity of Stripper A to form a 50 mm diameter circular pool on the surface of the coated tiles. Stripper A was allowed to remain on the coated tiles for a 30 minute standing time. The cylinder was then rolled 10 times over each tile. Strippability was evaluated using the following scale:

Strippability Scale

1) No effect
2) Minimal chemical attack on coating
3) Moderate chemical attack on coating
4) Severe chemical attack on coating with onset of stripping
5) Incomplete strip (may strip completely in some areas, especially where coating was porous, but not in other areas. Coating is slightly soft or tacky)
6) Incomplete strip with softened coating in all areas
7) Complete strip The coated tiles were also evaluated for surface scratch resistance using a Gardner abrasion tester, available from Byk Gardner Inc. This test is performed by abrading each tile sample for 100 back and forth cycles across the surface of the coated tile using a SCOTCH-BRITE Floor Maintenance Disc mounted to project approximately 13 mm below the brush holder of the abrasion tester. Water was added to the surface of each tile after the second or third abrasion cycle. Following the completion of 100 cycles, the tile sample was removed from the machine, rinsed and dried. The gloss level after abrasion was evaluated using the following scale:

Surface Scratch Test Scale

1) No visible scratches—equivalent to a "no-wax" tile
2) Scattered surface scratches, with no loss in gloss at 90°
3) to 6) Surface scratching with increasing scratch density and gloss loss
7) Complete surface scratch covering with gloss loss
8) Complete film scratching—coating is worn away.

Deep Scratch Resistance

The coated tiles were also evaluated for deep scratch resistance using a Gardner Balanced Beam Scrape Adhesion Mar Tester (Deep Scratch; Hoffman Stylus), available from the Paul N. Gardner Company, Inc. This test was performed according to the manufacturer's directions by placing a 500 g weight in one of the 10 numbered holes in the weight beam. The cured films were evaluated according to a 10 point scale, with the rating of a coating corresponding to the highest-numbered weight beam position that did not cause film failure and with higher ratings corresponding to better deep scratch resistance. A coating preferably exhibits a rating of at least 6.

Adhesion Loss Test

The coated tiles were evaluated for coating adhesion by cross-hatching the coating with a blade to form a 7×7 grid containing 49 squares. A piece of SCOTCH™ No. 600 transparent tape (3M) was applied to the grid and removed. The number of squares exhibiting coating delamination was divided by the total number of squares to calculate the percent of adhesion loss.

EXAMPLE 1

150 mm square uncoated black vinyl composite floor tiles from Armstrong Tile were roughened with a nonwoven abrasive scrub pad (SCOTCH-BRITE green abrasive, 3M) until the tile surface was no longer shiny. A single thick coat containing 3.5 g of a waterborne metal-catalyzed acrylic floor finish (PADLOCK, Ecolab Inc.) was applied to the roughened tiles at a 20% solids level and allowed to air dry to form a strippable intermediate coating. Each coated tile was placed in an oven for 15 minutes at 60° C. to insure that the intermediate coating was dry. The dried intermediate coating was overcoated with a single thick coat containing 3.5 g of a UV curable finish made from the ingredients set out below in Table 1:

TABLE 1

| Ingredient | Parts |
| --- | --- |
| 3.5 Functional acrylate oligomer[1] | 20.63 |
| Hexafunctional acrylate resin[2] | 10.00 |
| Vinyl ether oligomer[3] | 6.75 |
| Cosolvent[4] | 4.25 |
| 3.5 Functional acrylate oligomer[5] | 3.75 |
| Inorganic particles[6] | 2.25 |
| Photoinitiator[7] | 1.76 |
| Fluorosurfactant, 10%[8] | 0.61 |
| Defoamer[9] | 0.11 |
| Deionized water | 49.90 |

[1]LAROMER ™ PB 55W oligomer, available from BASF Corp.
[2]EBECRYL ™ 1290 aliphatic urethane acrylate, available from UCB Chemicals.
[3]VEctomer ™ VE 1312 oligomer, available from Morfiex Inc.
[4]ETHYL CARBITOL ™, available from Union Carbide Corp.
[5]LAROMER ™ PO 94F oligomer, available from BASF Corp.
[6]SNOWTEX ™ OZL, available from Nissan Chemicals
[7]50:50 blend of IRGACURE ™ 500 and IRGACURE ™ 184, both available from Ciba Geigy Company
[8]ZONYL ™ FSJ, available from E. I. duPont de Nemours & Co.
[9]PI-35, available from Ultra Additives, Inc.

The coated tiles were passed through a UV curing apparatus containing an H bulb mercury vapor lamp operated at 1.94 joule/sec per cm$^2$ and about 3 meters per minute.

The coated tiles exhibited a Strippability Rating of 6, a Surface Scratch rating of 1 and a Deep Scratch Rating of 6. This represented a very desirable balance of properties.

EXAMPLES 2 THROUGH 5 AND COMPARATIVE EXAMPLES 1 AND 2

Using the general method of Example 1, tiles were coated with an intermediate coating and allowed to air dry for 60 minutes at 26° C. The tiles were next overcoated with a single thick coat containing 3.5 g of various UV curable finishes made from the ingredients set out below in Table 2:

TABLE 2

| | Parts | | | | | |
| --- | --- | --- | --- | --- | --- | --- |
| Ingredient | Comp. Ex. 1 | Comp. Ex. 2 | Ex. 2 | Ex. 3 | Ex. 4 | Ex. 5 |
| Trifunctional acrylate oligomer[1] | 40.00 | | | | | |
| Trifunctional acrylate oligomer[2] | | 10.00 | | | | |

TABLE 2-continued

|  | Parts | | | | | |
| --- | --- | --- | --- | --- | --- | --- |
| Ingredient | Comp. Ex. 1 | Comp. Ex. 2 | Ex. 2 | Ex. 3 | Ex. 4 | Ex. 5 |
| Vinyl ether oligomer[3] | 10.00 | | | 6.75 | 6.75 | 6.75 |
| 3.5 Functional acrylate oligomer[4] | | 48.75 | 28.5 | 20.63 | 20.63 | 35.25 |
| 3.5 Functional amine-modified acrylate oligomer[5] | | 3.75 | 3.75 | 3.75 | 3.75 | 3.75 |
| Hexafunctional acrylate oligomer[6] | | | 10.00 | 10.00 | 10.00 | |
| Hexafunctional acrylate oligomer[7] | | | | | 6.75 | |
| Cosolvent[8] | 6.30 | 6.30 | 6.30 | 6.30 | 6.30 | 6.30 |
| Inorganic particles[9] | 3.33 | 3.33 | 3.33 | 3.33 | 3.33 | 3.33 |
| Photoinitiator[10] | 2.60 | | | | | |
| Photoinitiator[11] | | 3.00 | 3.00 | 3.00 | 3.00 | 3.00 |
| Fluoro-surfactant, 10%[12] | 0.90 | 0.90 | 0.90 | 0.90 | 0.90 | 0.90 |
| Defoamer[13] | 0.15 | 0.15 | 0.15 | 0.15 | 0.15 | 0.15 |
| Deionized water | 26.72 | 33.82 | 44.07 | 48.66 | 38.44 | 40.57 |
| Total | 100.00 | 100.00 | 100.00 | 100.00 | 100.00 | 100.00 |
| % Solids | 38.60 | 32.12 | 32.00 | 34.81 | 48.91 | 32.12 |

[1]VIAKTIN ™ VTE 6155 aliphatic urethane acrylate, available from Solutia, Inc.
[2]VIAKTIN ™ VTE 6160 aliphatic urethane acrylate, available from Solutia, Inc.
[3]VEctomer ™ VE 1312 oligomer, available from Morflex Inc.
[4]LAROMER ™ PE 55WN oligomer, available from BASF Corp.
[5]LAROMER ™ PO 94F oligomer, available from BASF Corp.
[6]EBECRYL ™ 8301 hexafunctional aliphatic urethane acrylate, available from UCB Chemicals
[7]EBECRYL ™ 1290 hexafunctional aliphatic urethane acrylate, available from UCB Chemicals
[8]ETHYL CARBITOL ™, available from Union Carbide Corp.
[9]KLEBOSOL 30N25 colloidal silica sol, available from Clariant Corp.
[10]IRGACURE ™ 500, available from Ciba-Geigy Company
[11]DAROCURE ™ 1173, available from Ciba-Geigy Company
[12]ZONYL ™ FSJ, available from E. I. duPont de Nemours & Co.
[13]PI-35, available from Ultra Additives, Inc.

These UV-curable formulations were allowed to air dry for 60 minutes at 26° C., passed through a UV curing apparatus containing an H bulb mercury vapor lamp operated at 0.497 joule/sec per cm$^2$ and about 3 meters per minute. The coated tiles were evaluated for gloss, surface scratch resistance, deep scratch resistance and strippability. The results are set out below in Table 3.

TABLE 3

|  | Comp. Ex. 1 | Comp. Ex. 2 | Ex. 2 | Ex. 3 | Ex. 4 | Ex. 5 |
| --- | --- | --- | --- | --- | --- | --- |
| Gloss | 99 | 97 | 99 | 99 | 90 | 65 |
| Surface Scratch resistance (1–8)[1] | 7 | 1 | 3 | 6 | 3 | 3 |
| Deep Scratch resistance (1–10)[2] | 4 | 4 | 7 | 7 | 8 | 7 |
| Strippability, 10 minutes (1–7)[3] | 7 | 6 | 2 | 4 | 1 | 7 |

[1]Lower values indicate better results.
[2]Higher values indicate better results.
[3]Higher values indicate better results.

The results in Table 3 show the attainment of significantly improved deep scratch resistance. The compositions of Example 2 and Example 4 were difficult to strip, but would be useful for applications where strippability was not needed. The compositions of Example 3 and Example 5 provided improved strippability while maintaining good deep scratch resistance. The composition of Example 5 had a particularly desirable combination of surface scratch resistance, deep scratch resistance and strippability.

Various modifications and alterations of this invention will be apparent to those skilled in the art without departing from the scope and spirit of this invention. It should be understood that this invention is not limited to the illustrative embodiments set forth above.

We claim:

1. A waterborne radiation curable coating composition comprising sufficient amounts of:
    a) at least one acrylate functional oligomer having a functionality greater than 3, and
    b) at least one vinyl ether oligomer having a functionality greater than 1 to provide a coating that when cured will resist deep scratches.

2. A composition according to claim 1 comprising a water soluble or water dispersible acrylate functional oligomer.

3. A composition according to claim 1 comprising an acrylate functional oligomer having a functionality of at least 5.

4. A composition according to claim 1 comprising an acrylate functional oligomer having a functionality of at least 6.

5. A composition according to claim 1 comprising a water soluble or water dispersible vinyl ether oligomer.

6. A composition according to claim 1 comprising a vinyl ether oligomer having a functionality of at least 3.

7. A waterborne radiation curable coating composition comprising:
    a) about 13 to about 50 weight percent of at least one acrylate functional oligomer having a functionality greater than 3, and
    b) about 1 to about 20 weight percent of at least one vinyl ether oligomer having a functionality greater than 1.
in amounts sufficient to provide a coating that when cured will resist deep scratches.

8. A composition according to claim 7 comprising about 18 to about 37 weight percent acrylate functional oligomer and about 3 to about 10 weight percent vinyl ether oligomer.

9. A waterborne radiation curable coating composition comprising sufficient amounts of:
    a) at least one acrylate functional oligomer having a functionality greater than 3, and
    b) at least one vinyl ether oligomer having a functionality greater than 1, to provide a coating that when cured will resist deep scratches, wherein the cured coating is strippable.

10. A composition according to claim 9 wherein the cured coating can be removed from a substrate by applying to the cured coating an inhomogeneous stripper composition containing at least one polar solvent, allowing the stripper composition to contact the cured coating for sufficient time to soften the coating, and removing the softened coating from the substrate by mopping, vacuuming, mild abrasion or other measures that do not remove substantial portions of the substrate.

11. A method for protecting a surface comprising applying to the surface a waterborne radiation curable coating composition comprising:

(a) at least one acrylate functional oligomer having a functionality greater than 3, and (b) at least one vinyl ether oligomer having a functionality greater than 1 and drying and radiation curing the coating to provide a cured film that resists deep scratches.

12. A method according to claim 11 wherein the acrylate functional oligomer is water soluble or water dispersible.

13. A method according to claim 11 wherein the acrylate functional oligomer has a functionality of at least 5.

14. A method according to claim 11 wherein the acrylate functional oligomer has a functionality of at least 6.

15. A method according to claim 11 wherein the vinyl ether oligomer is water soluble or water dispersible.

16. A method according to claim 11 wherein the vinyl ether oligomer has a functionality of at least 3.

17. A method for protecting a surface comprising applying to the surface a waterborne radiation curable coating composition comprising:

(a) about 13 to about 50 weight percent of at least one acrylate functional oligomer having a functionality greater than 3, and (b) about 1 to about 20 weight percent of at least one vinyl ether oligomer having a functionality greater than 1 and drying and radiation curing the coating to provide a cured film that resists deep scratches.

18. A method according to claim 17 wherein the radiation curable composition comprises about 18 to about 37 weight percent acrylate functional oligomer and about 3 to about 10 weight percent vinyl ether oligomer.

19. A method according to claim 11 wherein the surface comprises wood, vinyl or vinyl composite.

20. A method for protecting a surface that comprises a multipiece flooring material whose pieces have a top surface, a side surface or surfaces and gaps between pieces, comprising coating the top surface and at least the uppermost portion of the gaps with a layer or layers of a waterborne radiation curable coating composition comprising:

(a) at least one acrylate functional oligomer having a functionality greater than 3, and (b) at least one vinyl ether oligomer having a functionality greater than 1 and drying and radiation curing the coating to provide a cured film that resists deep scratches.

21. A method for protecting a surface comprising applying to the surface a strippable intermediate coating and a radiation cured film, the radiation cured film being less strippable and more durable than the intermediate coating and comprising a waterborne radiation curable coating composition comprising:

(a) at least one acrylate functional oligomer having a functionality greater than 3, and (b) at least one vinyl ether oligomer having a functionality greater than 1 and drying and radiation curing the waterborne radiation curable coating to provide a cured film that resists deep scratches.

22. A method for protecting a floor comprising applying to the floor a waterborne radiation curable coating composition comprising at least one acrylate functional oligomer having a functionality greater than 3, and drying and radiation curing the coating to provide a cured film that resists deep scratches.

23. A method according to claim 22 wherein the waterborne coating composition comprises a water soluble or water dispersible acrylate functional oligomer and a water soluble or water dispersible vinyl ether or oligomer.

24. A method according to claim 22 wherein the waterborne coating composition comprises an acrylate functional oligomer having a functionality of at least 6.

25. A method according to claim 22 weherein the waterborne coating composition comprises a vinyl ether oligomer having a functionality of at least 3.

26. A method for protecting a floor comprising applying to the floor a waterborne radiation curable coating composition comprising about 13 to about 50 weight percent of at least one acrylate functional oligomer having a functionality greater than 3 and about 1 to about 20 weight percent vinyl ether oligomer, and drying and radiation curing the coating to provide a cured film that resists deep scratches.

27. A method according to claim 26 hwerein the waterborne coating composition comprises about 18 to about 37 weight percent acrylate functional oligomer and about 3 to about 10 weight percent vinly ether oligomer.

* * * * *

UNITED STATES PATENT AND TRADEMARK OFFICE
CERTIFICATE OF CORRECTION

PATENT NO. : 6,822,063 B2
DATED : November 23, 2004
INVENTOR(S) : Keith E. Olson et al.

It is certified that error appears in the above-identified patent and that said Letters Patent is hereby corrected as shown below:

Title page,
Item [56], References Cited, FOREIGN PATENT DOCUMENTS, "EP 1054020 A2 11/2001" should read -- EP 1054020 A2 11/2000 --

Column 2,
Line 49, "substratenon-damaging" should read -- substrate-non-damaging --

Column 6,
Line 7, "application" should read -- applications --

Column 9,
Line 14, "organosols" should read -- organosol --

Column 18,
Line 22, "vinyl ether or oligomer" should read -- vinyl ether oligomer --
Line 26, "weherein" should read -- wherein --
Line 36, "hwerein" should read -- wherein --
Line 39, "vinly" should read -- vinyl --

Signed and Sealed this

Twelfth Day of July, 2005

JON W. DUDAS
*Director of the United States Patent and Trademark Office*